(12) United States Patent
Nishimura et al.

(10) Patent No.: US 8,099,211 B2
(45) Date of Patent: Jan. 17, 2012

(54) ELECTRIC POWER STEERING APPARATUS

(75) Inventors: Akihiko Nishimura, Okazaki (JP); Hirozumi Eki, Okazaki (JP)

(73) Assignee: Jtekt Corporation, Osaka-shi (JP)

( * ) Notice: Subject to any disclaimer, the term of this patent is extended or adjusted under 35 U.S.C. 154(b) by 894 days.

(21) Appl. No.: 12/104,807

(22) Filed: Apr. 17, 2008

(65) Prior Publication Data

US 2008/0262678 A1 Oct. 23, 2008

(30) Foreign Application Priority Data

| Apr. 20, 2007 | (JP) | 2007-111761 |
| Sep. 21, 2007 | (JP) | 2007-245566 |
| Oct. 30, 2007 | (JP) | 2007-282155 |

(51) Int. Cl.
*A01B 69/00* (2006.01)

(52) U.S. Cl. ........ 701/41; 701/42; 701/70; 701/80; 180/6.2; 180/234; 180/408; 180/410; 180/443; 340/465

(58) Field of Classification Search .......... 701/41, 701/42, 70, 80; 180/6.2, 234, 408, 410, 443; 340/465
See application file for complete search history.

(56) References Cited

U.S. PATENT DOCUMENTS

| 6,107,767 A * | 8/2000 | Lu et al. .................. 318/561 |
| 6,131,693 A * | 10/2000 | Mukai et al. ............... 180/446 |
| 6,148,948 A | 11/2000 | Shimizu et al. |
| 6,161,068 A * | 12/2000 | Kurishige et al. ............ 701/41 |
| 6,407,524 B1 * | 6/2002 | Endo et al. ................ 318/432 |
| 6,445,987 B1 * | 9/2002 | Kurishige et al. ............ 701/41 |
| 6,999,862 B2 * | 2/2006 | Tamaizumi et al. .......... 701/41 |
| 7,079,929 B2 * | 7/2006 | Sawada et al. .............. 701/41 |
| 7,647,149 B2 * | 1/2010 | Tsuchiya .................... 701/41 |
| 7,831,355 B2 * | 11/2010 | Nishiyama .................. 701/41 |
| 2002/0033300 A1 | 3/2002 | Takeuchi et al. |
| 2002/0056587 A1 | 5/2002 | Shibasaki et al. |
| 2002/0059824 A1 | 5/2002 | Ono et al. |
| 2004/0204812 A1 * | 10/2004 | Tran ........................... 701/80 |
| 2004/0245041 A1 * | 12/2004 | Fukuda et al. ............. 180/444 |

FOREIGN PATENT DOCUMENTS

| EP | 1 138 578 A2 | 10/2001 |
| EP | 1 564 109 A2 | 8/2005 |
| JP | 11-105729 | 4/1999 |
| JP | 2006-27537 | 2/2006 |
| JP | 2006-335228 | 12/2006 |

* cited by examiner

*Primary Examiner* — Mark Hellner
*Assistant Examiner* — Redhwan K Mawari
(74) *Attorney, Agent, or Firm* — Oblon, Spivak, McClelland, Maier & Neustadt, L.L.P.

(57) ABSTRACT

A microcomputer is provided with an extracting section capable of extracting a specific frequency component from an input signal. The extracting section extracts, from a pinion angle corresponding to a signal indicating a state of the steering system, a frequency component corresponding to a vibration of a steering system caused by stress applied to steerable wheels. The extracting section outputs an effective value of the extracted frequency component as a power spectrum to a second computing section. In the case that the power spectrum output from the extracting section is equal to or more than a predetermined threshold value, the microcomputer enhances a torque inertia compensation control so as to suppress vibration of the steering system caused by the stress. In other words, the microcomputer increases a torque inertia compensation amount corresponding to a compensation component based on a steering torque differential value.

4 Claims, 10 Drawing Sheets

US 8,099,211 B2

ELECTRIC POWER STEERING APPARATUS

This application is based on and claims priority from Japanese Patent Application No. 2007-111761 filed on Apr. 20, 2007, Japanese Patent Application No. 2007-245566 filed on Sep. 21, 2007, and Japanese Patent Application No. 2007-282155 filed on Oct. 30, 2007, the entire contents of which are incorporated herein by reference.

BACKGROUND OF THE INVENTION

The present invention relates to an electric power steering apparatus.

Conventionally, a power steering apparatus for a vehicle includes an electric power steering apparatus (EPS) provided with a motor as a driving source. The EPS has a feature that a flexibility of the layout is high, and an energy consumption is small, in comparison with a hydraulic power steering apparatus. Accordingly, in recent years, the introduction of the EPS has been considered for many kinds of vehicles ranging from compact vehicles to large-sized vehicles.

In the EPS mentioned above, a vibration generated in a steering system is one of factors that deteriorate the steering feel. In other words, if a driver feels vibration of the steering system or an abnormal noise caused by the vibration, the steering feel is greatly deteriorated. Accordingly, in the conventional EPS, for example, as disclosed in Japanese Laid-Open Patent Publication Nos. 2006-27537 and 2006-335228, various countermeasures are devised on a structure and on a control, for suppressing vibration of the steering system.

However, vibration generated in the steering system is not necessarily produced from the motor serving as the driving source. In other words, in the case that a stress is applied to steerable wheels such as traveling on a rough road surface, the vibration remains in the steering system until the stress is attenuated. The vibration is transmitted to the steering wheel, and can deteriorate the steering feel.

Japanese Laid-Open Patent Publication No. 2006-335228 discloses a structure which extracts a vibration frequency component from a motor rotation angle and a current value corresponding to a control output of the motor, and applies a vibration suppression control amount for canceling the vibration frequency component. In accordance with this configuration, it is possible to suppress the vibration generated in the steering system to some extent, in the EPS in which the motor and the steering system are coupled. However, since the vibration component of the steering system extracted from the control output of the motor is an indirect one, a phase shift is generated in a compensation control based on the vibration component. Therefore, there is a limit in an effect of the compensation control, and an effective countermeasure is desired for effectively suppressing the vibration of the steering system.

SUMMARY OF THE INVENTION

An objective of the present invention is to provide an electric power steering apparatus which effectively suppresses a vibration of a steering system generated by an application of a stress to steerable wheels.

To achieve the foregoing objective and in accordance with a first aspect of the present invention, an electric power steering apparatus applied to a steering system that transmits a steering operation of a driver to a steerable wheel is provided. The apparatus includes a steering force assist device, control means, and extracting means. The steering force assist device is provided with a motor as a driving source. The steering force assist device applies an assist force for assisting the steering operation to the steering system. The control means controls an actuation of the steering force assist device on the basis of a signal indicating a state of the steering system. The control means computes a target assist force to be generated in the steering force assist device by adding a compensation component based on a differential value of a steering torque to a basic assist component. The extracting means is capable of extracting, from a signal indicating the state of the steering system, a specific frequency component corresponding to a vibration generated in the steering system on the basis of a stress applied to the steerable wheel. When the effective value of the extracted specific frequency component is equal to or more than a predetermined threshold value, the control means increases the compensation component based on the differential value of the steering torque.

In accordance with a second aspect of the present invention, an electric power steering apparatus applied to a steering system that transmits a steering operation of a driver to a steerable wheel is provided. The apparatus includes a steering force assist device and control means. The steering force assist device is provided with a motor as a driving source. The steering force assist device applies an assist force for assisting the steering operation to the steering system. The control means controls an actuation of the steering force assist device. The control means computes a target assist force to be generated in the steering force assist device by adding a compensation component based on a differential value of a steering torque to a basic assist component. The control means increases the compensation component based on the differential value of the steering torque in the case that a vehicle speed exists in a predetermined speed range.

In accordance with a third aspect of the present invention, an electric power steering apparatus applied to a steering system that transmits a steering operation of a driver to a steerable wheel is provided. The apparatus includes a steering force assist device, control means, and rough road determining means. The steering force assist device is provided with a motor as a driving source. The steering force assist device applies an assist force for assisting a steering operation to the steering system. The control means controls an actuation of the steering force assist device. The control means computes a target assist force to be generated in the steering force assist device by adding a compensation component based on a differential value of a steering torque to a basic assist component. The rough road determining means determines whether a road surface on which the vehicle is traveling is rough. The control means increases the compensation component based on the differential value of the steering torque in the case that the road surface is determined to be rough.

DETAILED DESCRIPTION OF THE PREFERRED EMBODIMENTS

First Embodiment

A description will be given below of a column type electric power steering apparatus (EPS) according to a first embodiment of the present invention with reference to the accompanying drawings.

Figure 1:
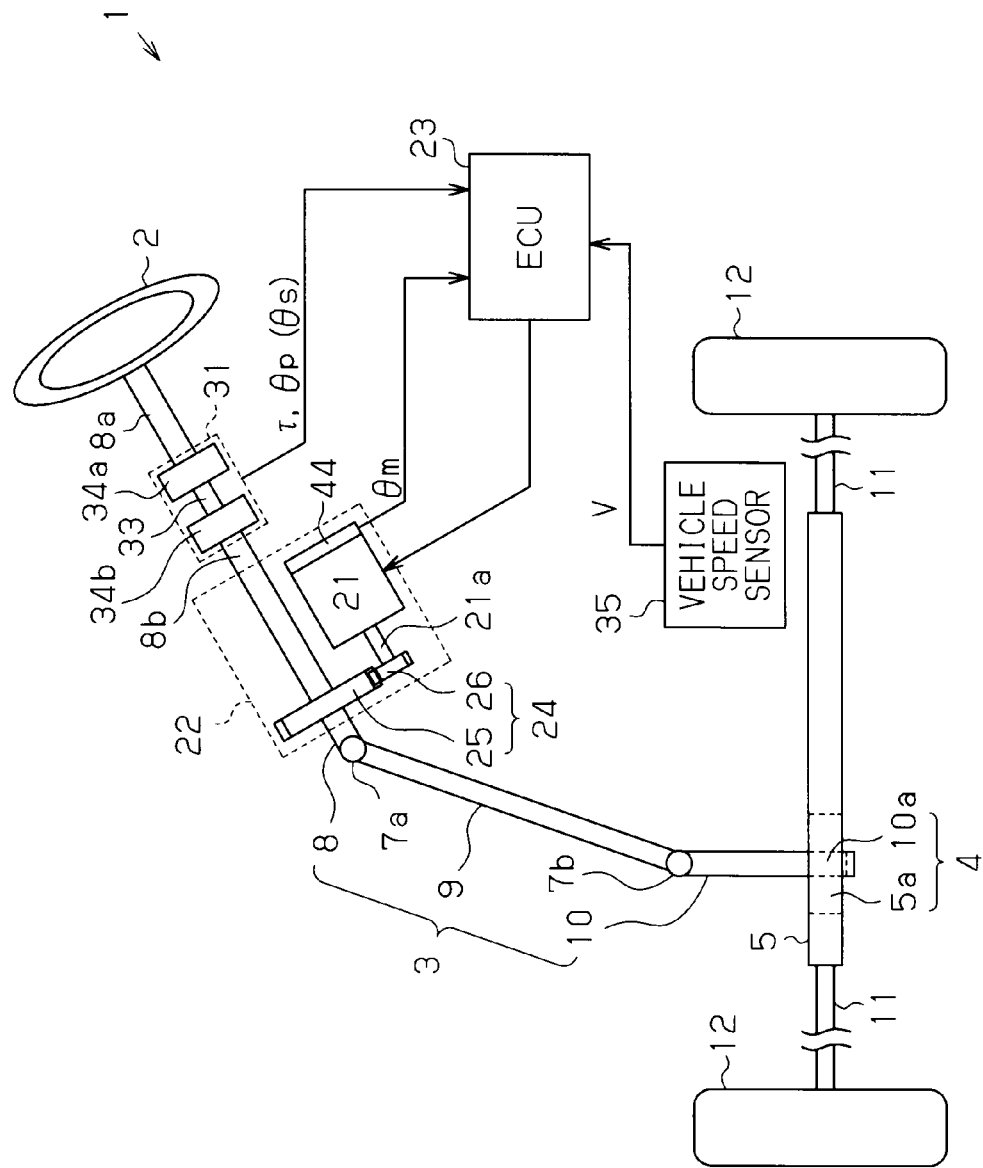
FIG. 1 is a diagrammatic view of an electric power steering apparatus (EPS)

As shown in FIG. 1, a steering wheel 2 is fixed to a steering shaft 3. The steering shaft 3 is coupled to a rack shaft 5 via a rack-and-pinion mechanism 4. A rotation of the steering shaft 3 accompanying a steering operation is converted into a reciprocating linear motion of the rack shaft 5 by the rack-and-pinion mechanism 4. Specifically, in the steering shaft 3, a column shaft 8 and an intermediate shaft 9 are coupled to each other via a universal joint 7a, and the intermediate shaft 9 and a pinion shaft 10 are coupled to each other via a universal joint 7b. The rack-and-pinion mechanism 4 is constituted by pinion teeth 10a formed in an end portion of the pinion shaft 10, and rack teeth 5a provided in the rack shaft 5 and engaging with the pinion teeth 10a. The reciprocating linear motion of the rack shaft 5 accompanying the rotation of the steering shaft 3 is transmitted to knuckles (not shown) via tie rods 11 coupled to both ends of the rack shaft 5. Accordingly, a steering angle of steerable wheels 12, that is, a forward moving direction of a vehicle is changed.

In the present embodiment, an EPS 1 corresponding to an electric power steering apparatus is provided with a motor 21 serving as a driving source, an EPS actuator 22 serving as a steering force assisting apparatus, and an ECU 23 controlling an actuation of the EPS actuator 22. The EPS actuator 22 applies an assist force for assisting a steering operation to a steering system by rotationally driving the steering shaft 3.

Describing in detail, the EPS actuator 22 is a column type EPS actuator applying an assist force to the column shaft 8. The motor 21 is drivingly coupled to the column shaft 8 via a speed reducing mechanism 24. The speed reducing mechanism 24 is constituted by a reduction gear 25, and a motor gear 26 engaging with the reduction gear 25. The reduction gear 25 is provided so as to be non-rotatable relative to the column shaft 8, and the motor gear 26 is provided so as to be non-rotatable relative to a motor shaft 21a of the motor 21. A worm and wheel mechanism is employed in the speed reducing mechanism 24. The EPS actuator 22 transmits the rotation of the motor 21 to the column shaft 8 while reducing speed by the speed reducing mechanism 24. Accordingly, a motor torque is applied as an assist force to the steering system.

The ECU 23 serving as control means feeds a driving power to the motor 21 serving as the driving source of the EPS actuator 22. The rotation of the motor 21, that is, the actuation of the EPS actuator 22 is controlled through the feed of the driving power.

A torque sensor 31 provided in the column shaft 8 is connected to the ECU 23. The column shaft 8 is constituted by a first shaft 8a which comes close to the steering wheel 2, a second shaft 8b which comes close to the intermediate shaft 9, and a torsion bar 33 which couples the first and second shafts 8a and 8b to each other. The torque sensor 31 is constituted by a pair of angle sensors 34a and 34b (resolvers) provided in both ends of the torsion bar 33, that is, an end portion of the first shaft 8a and an end portion of the second shaft 8b.

The torque sensor 31 is a twin resolver type torque sensor. The ECU 23 detects a rotation angle (a steering angle θs) of the first shaft 8a by the angle sensor 34a. Further, the ECU 23 detects a rotation angle (a pinion angle θp) of the second shaft 8b by the angle sensor 34b. The ECU 23 detects a steering torque τ on the basis of a difference between both the rotation angles detected by both the angle sensors 34a and 34b, that is, a torsion angle of the torsion bar 33.

A vehicle speed V detected by a vehicle speed sensor 35 is input to the ECU 23. The ECU 23 determines a target assist force to be applied to the steering system, on the basis of a vehicle state quantity detected by each of the sensors. The ECU 23 feeds a driving power to the motor 21 so as to generate the target assist force in the EPS actuator 22.

Next, a description will be given of the assist control in the EPS 1 mentioned above.

Figure 2:
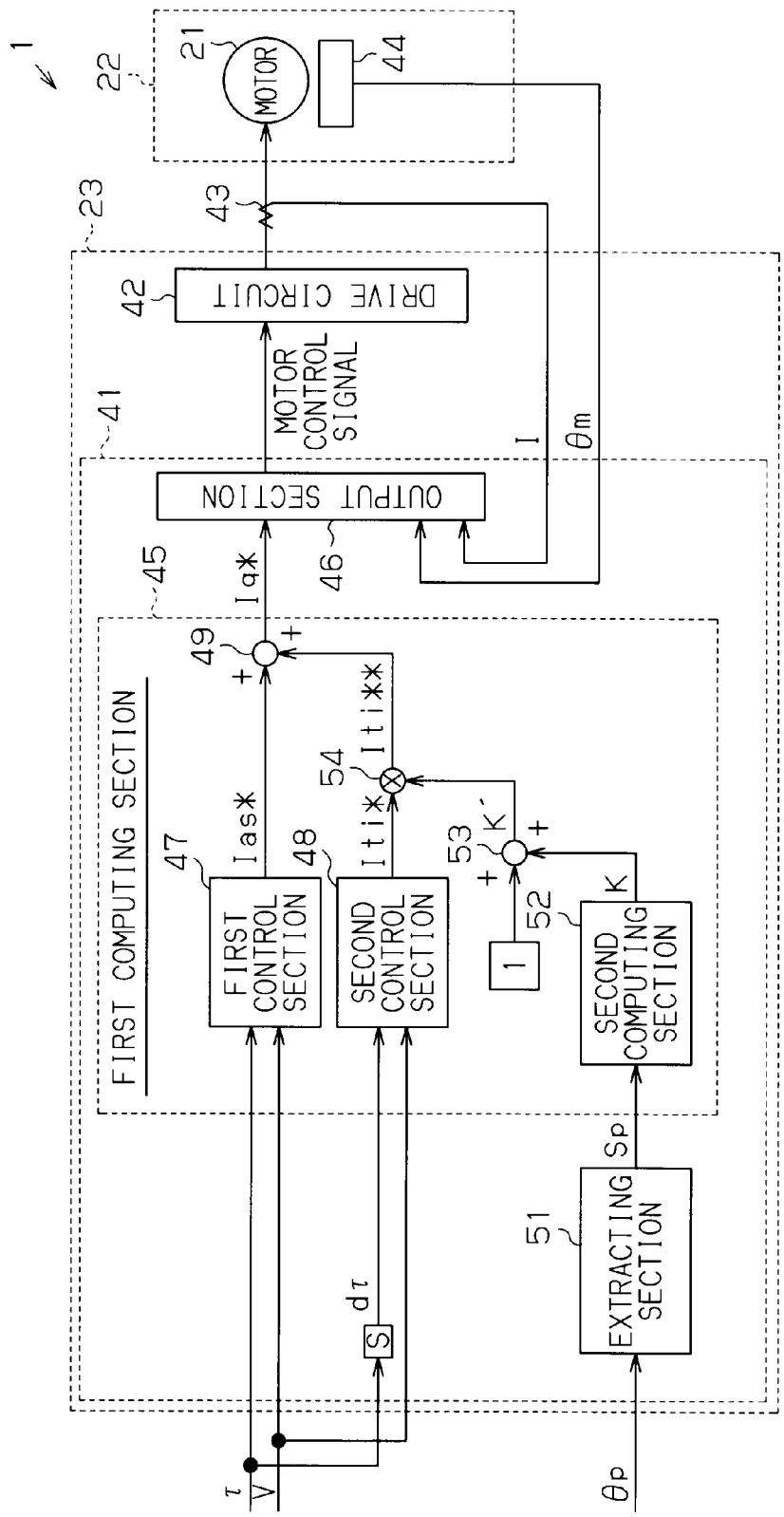
FIG. 2 is a control block diagram of an EPS in accordance with a first embodiment.

As shown in FIG. 2, the ECU 23 is provided with a microcomputer 41 and a drive circuit 42. The drive circuit 42 feeds the driving power to the motor 21 on the basis of a motor control signal output from the microcomputer 41.

The ECU 23 is connected to a current sensor 43 for detecting an actual current value I applied to the motor 21, and a rotation angle sensor 44 (refer to FIG. 1) for detecting a motor rotation angle θm. The microcomputer 41 generates a motor control signal output to the drive circuit 42 on the basis of each of the vehicle state quantities mentioned above, and the actual current value I and the motor rotation angle θm of the motor 21 detected on the basis of the output signals from the current sensor 43 and the rotation angle sensor 44.

The microcomputer 41 is provided with a first computing section 45 computing a current command value Iq* corresponding to a target value of the assist force applied to the steering system, that is, a target assist force, and an output section 46 outputting the motor control signal on the basis of the current command value Iq* calculated by the first computing section 45.

The first computing section 45 is provided with a first control section 47 computing a basic assist control amount Ias* corresponding to a basic control component of the target assist force, and a second control section 48 computing a torque inertia compensation amount Iti* based on a steering torque differential value dτ corresponding to a differential value of the steering torque τ, as a compensation component.

The steering torque τ and the vehicle speed V are input to the first control section 47. The first control section 47 computes a basic assist control amount Ias* on the basis of the steering torque τ and the vehicle speed V. Specifically, the first control section 47 increases the value of the basic assist control amount Ias* as the steering torque τ is increased, and as the vehicle speed V is decreased.

The vehicle speed V is input to the second control section 48, in addition to the steering torque differential value dτ. The second control section 48 executes a torque inertia compensation control on the basis of each of the state quantities. "Torque inertia compensation control" refers to a control for compensating an effect of the inertia of the EPS, such as the motor, the actuator or the like. In other words, "torque inertia compensation control" is a control for suppressing "catching feeling (response lag)" at a time of "starting turning" in the steering operation, and "influenced feeling (overshoot)" at a time of "finishing turning". The torque inertia compensation control has an effect of suppressing a vibration generated in the steering system by applying a stress to the steerable wheels 12.

Figure 3:
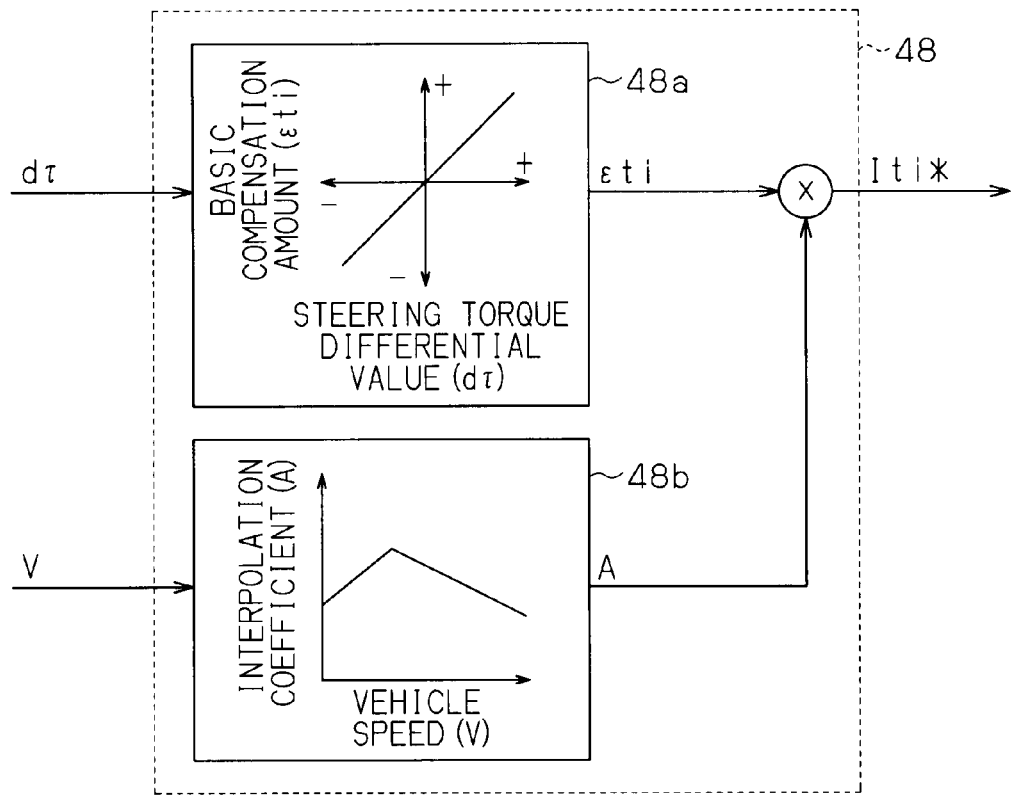
FIG. 3 is a control block diagram of a second control section.

As shown in FIG. 3, the second control section 48 is provided with a map 48a in which a steering torque differential value dτ and a basic compensation amount εti are associated, and a map 48b in which a vehicle speed V and an interpolation coefficient A are associated. In the map 48a, the basic compensation amount εti is set as a value increasing an absolute value of a basic assist control amount Ias* computed in the first control section 47 in accordance with an increase in the absolute value of the input steering torque differential value dτ. In the map 48b, the interpolation coefficient A becomes greater in connection with the vehicle speed V in a low vehicle speed range, and becomes smaller in accordance with an increase in the vehicle speed in a high vehicle speed range. The second control section 48 computes a torque inertia compensation amount Iti* by multiplying the basic compensation amount εti, which has been determined by referring to each of the maps 48a and 48b, by the interpolation coefficient A.

As shown in FIG. 2, the basic assist control amount Ias* computed in the first control section 47, and the torque inertia compensation amount Iti* (Iti**) computed in the second control section 48 are input to an adder 49. The first computing section 45 computes a current command value Iq* corresponding to a target assist force, by adding the torque inertia compensation amount Iti* to the basic assist control amount Ias* in the adder 49.

The current command value Iq* output by the first computing section 45 is input to the output section 46 together with the actual current value I detected by the current sensor 43, and the motor rotation angle θm detected by the rotation angle sensor 44. The output section 46 computes a motor control signal by executing a feedback control in such a manner as to make the actual current value I follow the current command value Iq* corresponding to the target assist force.

The motor 21 employs a brushless motor which is rotated by feeding a three-phase (U, V, W) driving power. The output section 46 carries out the current feedback control by converting (d/q conversion) a phase current value (Iu, Iv, Iw) of the motor 21 detected as the actual current value I into d,q-axes current values of a d/q coordinate system.

The current command value Iq* is input as a q-axis current command value to the output section 46. The output section 46 subject the phase current value (Iu, Iv, Iw) to d/q conversion on the basis of the motor rotation angle θm detected by the rotation angle sensor 44. The output section 46 computes the d,q axes voltage command value on the basis of the d,q axes current value and the q-axis current command value. The output section 46 computes a phase voltage command value (Vu*, Vv*, Vw*) by d/q inverse conversion of the d,q-axes voltage command value. The output section 46 generates a motor control signal on the basis of the phase voltage command value.

In the ECU 23, the generated motor control signal is output to the drive circuit 42 from the microcomputer 41. Further, the drive circuit 42 feeds the three-phase driving power based on the motor control signal to the motor 21, whereby the actuation of the EPS actuator 22 is controlled.

[Control for Suppressing Vibration Caused by Stress Applied to Steerable Wheels]

Next, a description will be given of a control for suppressing vibration caused by stress applied to the steerable wheels.

As shown in FIG. 2, the microcomputer 41 is provided with an extracting section 51 serving as extracting means. The extracting section 51 is capable of extracting a specific frequency component from the input signal. To the extracting section 51, there is input a pinion angle θp indicating a rotation angle of the pinion shaft 10 constructing the steering system, as a signal indicating a state of the steering system. The extracting section 51 extracts a specific frequency component corresponding to the vibration generated in the steering system, from the input pinion angle θp.

Specifically, the extracting section 51 extracts a frequency component corresponding to the vibration of the steering system generated by stress applied to the steerable wheels 12, on the basis of the input pinion angle θp. The extracting section 51 outputs an effective value of the extracted frequency component as a power spectrum Sp to the second computing section 52.

In the case that the power spectrum Sp from the extracting section 51 is equal to or more than a predetermined threshold value, the microcomputer 41 enhances the torque inertia compensation control in such a manner as to suppress the vibration of the steering system caused by adding the stress to the steerable wheels. In other words, the microcomputer 41 increases the torque inertia compensation amount Iti* corresponding to the compensation component based on the steering torque differential value dτ.

As mentioned above, the torque inertia compensation control has the effect of suppressing the vibration generated in the steering system. In other words, the vibration of the steering system caused by adding the inverse input stress can be effectively suppressed by enhancing the torque inertia compensation control. However, there is a tendency that a rising edge of the assist torque becomes excessively enlarged by enhancing the torque inertia compensation control, that is, increasing the torque inertia compensation amount Iti*. In other words, there is a risk that an overuse of the enhancement of the torque inertia compensation control causes adverse effects such as a deterioration of the steering feel at a normal time, a "slipping feeling" at a time of starting turning, an unstableness of the control (vibration) or the like.

Taking this point into consideration, the EPS 1 in accordance with the present embodiment instantaneously detects the generation of the vibration caused by stress applied to the steerable wheels 12, by extracting the frequency component corresponding to the vibration of the steering system caused by stress applied to the steerable wheels 12. It is possible to quickly suppress the vibration caused by adding the stress applied to the steerable wheels 12 while avoiding the generation of the adverse effect caused by enhancing the torque inertia compensation control, by executing the enhancement of the torque inertia compensation control, on the basis of the detection of the vibration.

Figure 4:
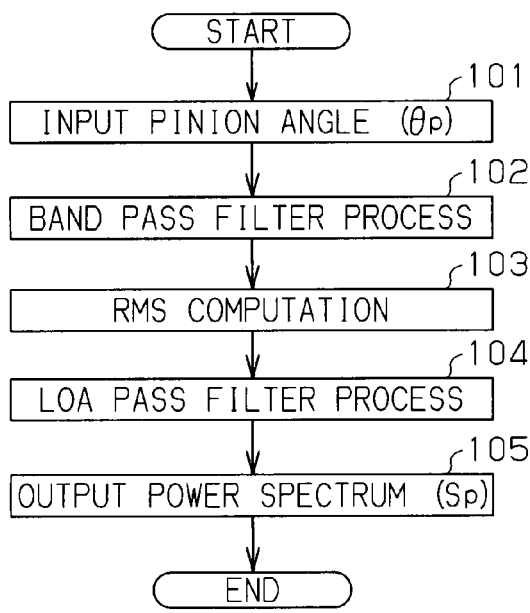
FIG. 4 is a flowchart showing a procedure for extracting a specific frequency.

If the pinion angle θp is input to the extracting section 51 (step 101), as shown in a flowchart in FIG. 4, the extracting section 51 first executes a band pass filter process, and extracts a frequency component of 14 to 16 Hz as a specific frequency component corresponding to the vibration of the steering system by adding the stress applied to the steerable wheels 12 (step 102). Next, the extracting section 51 determines an effective value of the frequency component extracted in step 102 on the basis of a root means square (RMS) computation (step 103). The extracting section 51 executes a low pass filter process (step 104), and outputs a value after the low pass filter process as a power spectrum Sp (step 105).

Further, the first computing section 45 of the microcomputer 41 is provided with a second computing section 52 computing an enhancing gain K. The enhancing gain K is a value for enhancing the torque inertia compensation control, that is, for increasing the torque inertia compensation amount Iti*. The power spectrum Sp output from the extracting section 51 is input to the second computing section 52.

Figure 5:
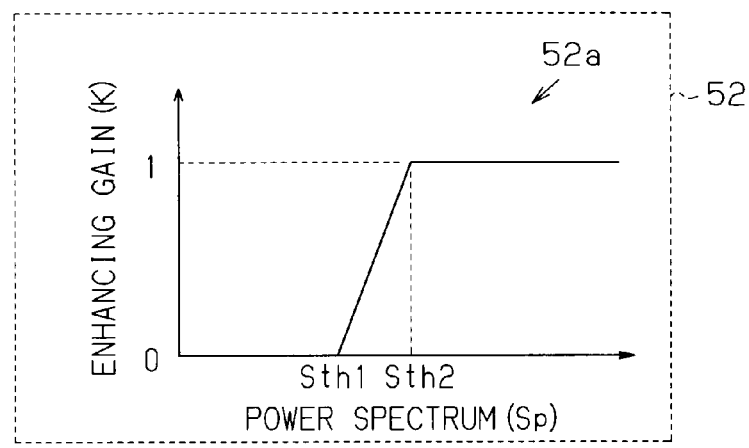
FIG. 5 is a diagrammatic view of a second computing section.

As shown in FIG. 5, the second computing section 52 has a map 52a in which the power spectrum Sp and the enhancing gain K are associated. In the map 52a, the enhancing gain K becomes greater along with an increase in the power spectrum Sp, in a range in which the power spectrum Sp is equal to or more than a first threshold value Sth1. Specifically, in a range (Sth1≦Sp≦Sth2) in which the power spectrum Sp is equal to or more than the first threshold value Sth1 and equal to or less than a second threshold value Sth2, the value of the enhancing gain K increases from "0" to "1" along with the increase in the power spectrum Sp. Further, in a range in which the power spectrum Sp exceeds the second threshold value Sth2, the value of the enhancing gain K is "1". The second computing section 52 refers the input power spectrum Sp to the map 52a. Accordingly, in the case that the value of the power spectrum Sp is equal to or more than a predetermined threshold value, the greater the value of the power spectrum Sp becomes, the greater the value of the computed enhancing gain K becomes.

The enhancing gain K computed by the second computing section 52 is input to an adder 53. In the adder 53, the value "1" is added to the enhancing gain K. Accordingly, an enhancing gain K', which is at least equal to or more than "1", is obtained. Further, the enhancing gain K' is input to a multiplier 54. In the multiplier 54, the enhancing gain K' is multiplied by the torque inertia compensation amount Iti*. Therefore, the torque inertia compensation amount Iti** is corrected and increased, and the torque inertia compensation control is enhanced.

In accordance with the present embodiment, the following operations and advantaged are achieved.

(1) The microcomputer 41 is provided with the extracting section 51, which is capable of extracting a specific frequency component from the input signal. The extracting section 51 extracts the frequency component corresponding to the vibration of the steering system caused by stress applied to the steerable wheels 12, on the basis of the pinion angle θp corresponding to the signal indicating the state of the steering system. Further, the extracting section 51 outputs the effective value of the extracted frequency component as the power spectrum Sp. In the case that the power spectrum Sp output by the extracting section 51 is equal to or more than the predetermined threshold value, the microcomputer 41 enhances the torque inertia compensation control in such a manner as to suppress the vibration of the steering system caused by adding the stress applied to the steerable wheels 12. In other words, the microcomputer 41 increases the torque inertia compensation amount Iti* corresponding to the compensation component based on the steering torque differential value dτ.

In accordance with the structure mentioned above, it is possible to instantaneously detect the generation of vibration caused by stress applied to the steerable wheels 12, before the vibration caused by the stress becomes evident, and it is possible to quickly suppress the vibration. Since the vibration is suppressed by enhancing the torque inertia compensation control, the reduction of the vibration suppressing effect caused by a shift of the phase which is seen in the prior art does not occur. Further, it is possible to avoid the adverse effects such as the deterioration of the steering feel, the "slipping feeling" at a time of starting turning, the unstableness of the control (vibration) or the like caused by enhancing the compensation control. In addition, it is possible to optimize the setting of the torque inertia compensation control at the normal time, by separating the vibration countermeasure by stress applied to the steerable wheels 12, and it is possible to further improve the steering feel.

(2) The greater the power spectrum Sp becomes, the greater the value of the enhancing gain K computed by the second computing section 52 becomes. As mentioned above, it is possible to quickly suppress the vibration while avoiding the generation of the adverse effects, by enhancing the torque inertia compensation control in correspondence to the magnitude of the generated vibration.

Second Embodiment

A description will be given below of a second embodiment of the present invention with reference to the accompanying drawings.

A main difference between the present embodiment and the first embodiment lies only in the control of suppressing the vibration caused by the stress applied to the steerable wheels 12. Accordingly, as a matter of convenience for explanation, the same reference numerals are attached to the same portions as those of the first embodiment, and a description thereof will be omitted.

Figure 6:
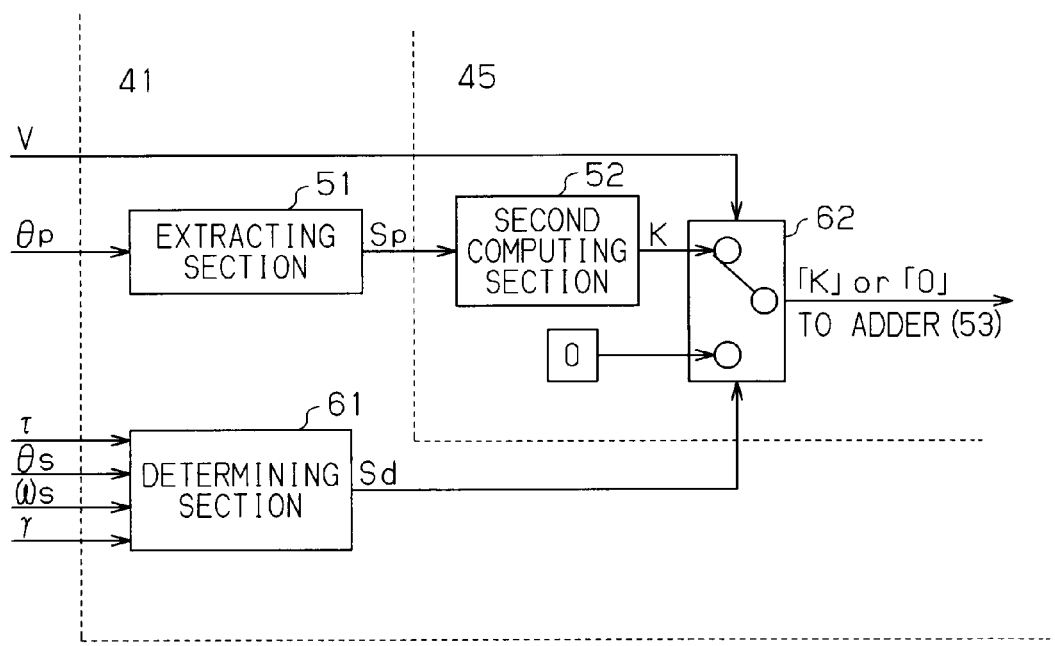
FIG. 6 is a control block diagram of an EPS in accordance with a second embodiment.

As shown in FIG. 6, the microcomputer 41 is provided with a determining section 61 serving as determining means that determines whether a steering operation by a driver is being performed, that is, whether the EPS 1 is in a steering state. In the case that the determining section 61 determines that the steering operation is being performed, that is, at a time of the steering operation, the microcomputer 41 does not execute the enhancement of the torque inertia compensation control, that is, the increase in the torque inertia compensation amount Iti*.

A steering torque τ, a steering angle θs, a steering speed ωs, and a yaw rate γ of the vehicle are input to the determining section 61. The determining section 61 determines whether the steering operation is being performed, on the basis of each of the input state quantities, and outputs a result of determination as a determination signal Sd.

Figure 7:
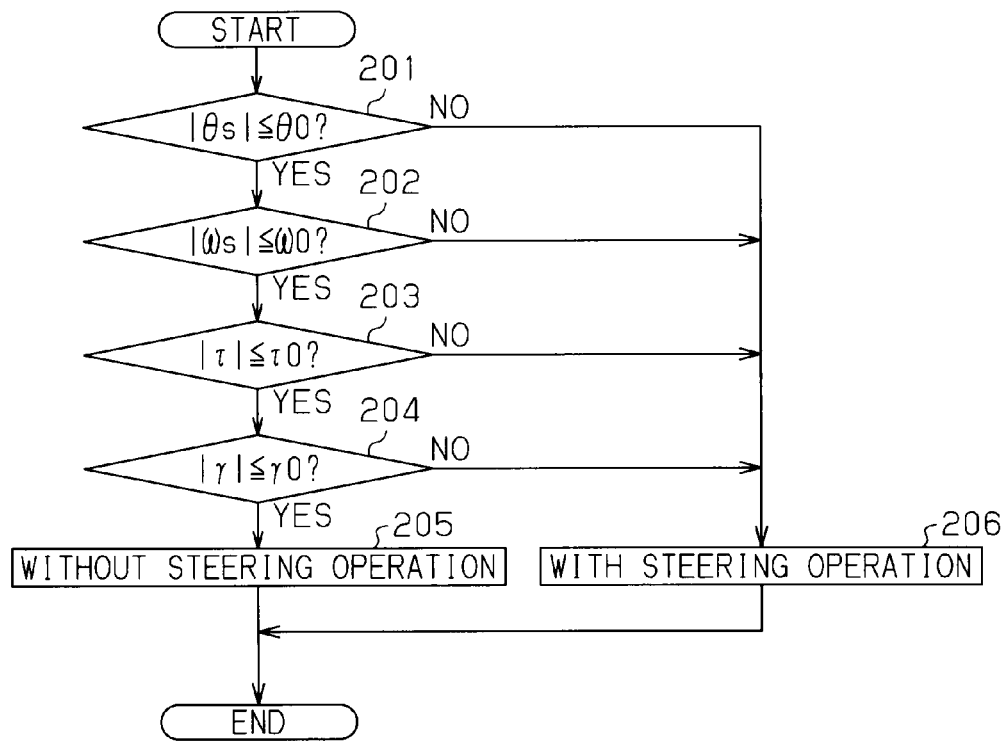
FIG. 7 is a flowchart showing a procedure for determining a steering state.

As shown in a flowchart in FIG. 7, the determining section 61 compares the absolute value of each of the input state quantities with a predetermined threshold value corresponding to each of the state quantities, and determines whether the steering operation is being performed on the basis of the results (steps 201 to 204). In other words, the determining section 61 determines whether the absolute value of the steering angle θs is equal to or less than the predetermined threshold value θ0 (step 201), whether the absolute value of the steering speed ωs is equal to or less than the predetermined threshold value ω0 (step 202), whether the absolute value of the steering torque τ is equal to or less than the predetermined threshold value τ0 (step 203), and whether the absolute value of the yaw rate γ is equal to or less than the predetermined threshold value γ0 (step 204). In the case that all the state quantities are equal to or less than the corresponding threshold values (|θs|≦θ0, and |ωs|≦ω0, and |τ|≦τ0, and |γ|≦|γ0|, that is, all steps 201 to 204 are YES), the determining section 61 determines that the steering operation is not being performed (step 205).

In the case that at least any one of the input state quantities exceeds the corresponding threshold value (|θs|>θ0, or

|ωs|>ω0, or |τ|>τ0, or |↑γ|>γ0, that is, any one of steps 201 to 204 is NO), the determining section 61 determines that the steering operation is being performed (step 206).

As shown in FIG. 6, the first computing section 45 is provided with a switching control section 62. The enhancing gain K (and "0") output from the second computing section 52 is output to the adder 53 via the switching control section 62. Further, the determination signal Sd output from the determining section 61 is input to the switching control section 62 together with the vehicle speed V. The switching control section 62 executes a switch control switching the output to the adder 53 (refer to FIG. 2) between the enhancing gain K and "0", on the basis of the input determination signal Sd and vehicle speed V.

Figure 8:
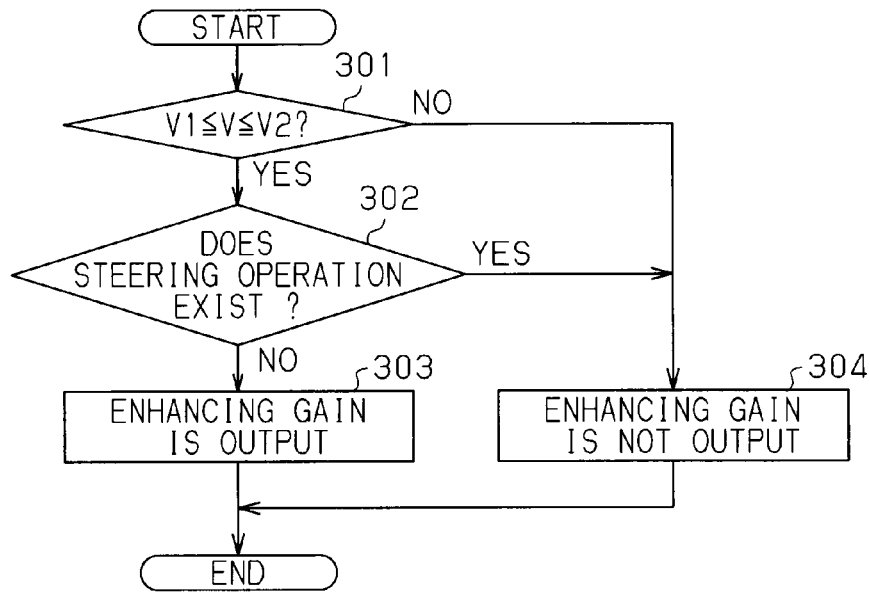
FIG. 8 is a flowchart showing a procedure of a switch control relating to an output of an enhancing gain.

As shown in a flowchart in FIG. 8, the switching control section 62 first determines whether the input vehicle speed V is in a predetermined speed range (V1≦V≦V2) (step 301). In the case that the vehicle speed V is in the speed range (YES in step 301), the switching control section 62 determines whether the input determination signal Sd indicates that the steering operation is being performed (step 302). In the case that the determination signal Sd indicates that the steering operation is not being performed (NO in step 302), the switching control section 62 outputs the enhancing gain K to the adder 53 (step 303). If it is determined that the vehicle speed V is not in the predetermined speed range (V<V1, or V>V2, NO in step 301), and in the case that the determination signal Sd indicates that the steering operation is being performed (YES in step 302), the switching control section 62 does not output the enhancing gain K, and the output thereof comes to "0" (step 304).

As a result, in the microcomputer 41, the enhancement of the torque inertia compensation control, that is, the increase in the torque inertia compensation amount Iti* is executed, only in the case that the vehicle speed V exists in a predetermined speed range (V1≦V≦V2), and the enhancement of the torque inertia compensation control is not executed at a time of the steering operation.

In accordance with the present embodiment, the following operations and advantages are achieved.

(1) The microcomputer 41 is provided with the determining section 61 determining whether the steering operation by the driver is being performed. At a time of the steering operation, the microcomputer 41 does not execute the enhancement of the torque inertia compensation control, that is, the increase in the torque inertia compensation amount Iti*.

In other words, there is a case that the enhancement of the torque inertia compensation control may cause the deterioration of the steering feel (the "slipping feeling" at a time of starting turning). However, as in the structure mentioned above, since the enhancement of the torque inertia compensation control is not executed at a time of the steering operation, but is executed limitedly at a time when the steering operation is not being executed, it is possible to avoid the deterioration of the steering feel caused by the enhancement of the torque inertia compensation control.

(2) The microcomputer 41 executes the enhancement of the torque inertia compensation control (the increase in the torque inertia compensation amount Iti*) only in the case that the vehicle speed V is in the predetermined speed range (V1≦V≦V2).

In other words, the amplitude of vibration generated in the steering system depends on a vibration characteristic of a suspension bearing the steerable wheels 12, and is amplified in the specific speed range (V1≦V≦V2) in which a resonance is generated in the suspension. Accordingly, it is possible to effectively avoid the deterioration of the steering feel caused by the compensation control, by executing the enhancement of the torque inertia compensation control limitedly in the speed range in which the vibration of the steering system becomes most significant.

Third Embodiment

A description will be given of a third embodiment of the present invention with reference to the accompanying drawings.

A main difference between the present embodiment and the first embodiment lies only in the control of suppressing the vibration caused by stress applied to the steerable wheels 12. Accordingly, as a matter of convenience for explanation, the same reference numerals are attached to the same portions as those of the first embodiment, and a description thereof will be omitted.

The microcomputer 41 serves as rough road determining means determining whether a road surface on which the vehicle is traveling, that is, a road surface is rough. In the case that the traveling road surface is determined as a rough road, the microcomputer 41 increases the torque inertia compensation amount Iti* corresponding to the compensation component based on the steering torque differential value dτ in the same manner as the first embodiment.

In other words, at a time of traveling on the rough road, a frequency at which the stress is applied to the steerable wheels 12 is high, and a probability at which the vibration is generated in the steering system becomes extremely high. Taking this point into consideration, in the present embodiment, the torque inertia compensation control is enhanced in advance in the case mentioned above. Accordingly, the generation of the vibration caused by stress applied to the steerable wheels 12 is effectively suppressed.

Describing in detail, a signal indicating a wheel speed V_w is input to the microcomputer 41. Further, the determination on whether the traveling road surface is a rough road is carried out on the basis of a frequency analysis of the wheel speed V_w.

Specifically, the wheel speed V_w is input to the extracting section 51, in place of the pinion angle θp used as the signal indicating the state of the steering system in the first embodiment. The extracting section 51 extracts a specific frequency component increasing at a time of traveling on a rough road surface, that is, a high frequency component, from the wheel speed V_w. The extracting section 51 outputs a power spectrum Sp corresponding to an effective value of the extracted frequency component to the second computing section 52 (refer to FIG. 2).

Figure 9:
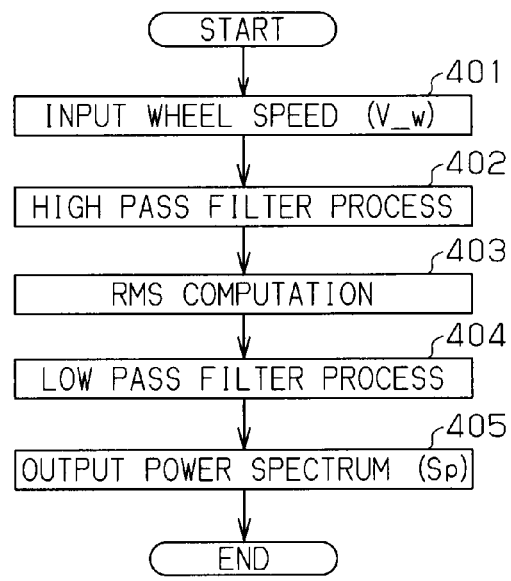
FIG. 9 is a flowchart showing a procedure for extracting a specific frequency in a third embodiment.

As shown in a flowchart in FIG. 9, if the wheel speed V_w is input to the extracting section 51 (step 401), the extracting section 51 executes a high pass filter process, and extracts the high frequency component corresponding to traveling on a rough road surface (step 402). Next, the extracting section 51 determines the effective value of the frequency component extracted in step 402 in accordance with a root means square (RMS) computation (step 403). The extracting section 51 executes a low pass filter process (step 404), and outputs a value after the low pass filter process as the power spectrum Sp (step 405).

Since the enhancing gain K is computed on the basis of the power spectrum Sp, that is, since the greater enhancing gain K is computed along with the increase in the effective value of the frequency component indicating traveling on a rough road (refer to FIG. 5), the increase in the torque inertia compensation amount Iti*, that is, the enhancement of the torque inertia compensation control is carried out. In this case, each of threshold values Sth1 and Sth2 in FIG. 5 should be optimized in correspondence to a change of the subject to be determined.

Fourth Embodiment

A description will be given of a fourth embodiment obtained of the present invention with reference to the accompanying drawings.

A main difference between the present embodiment and the third embodiment lies only in the determining method of the rough road. Accordingly, as a matter of convenience for explanation, the same reference numerals are attached to the same portions as those of the fourth embodiment, and a description thereof will be omitted.

The microcomputer 41 in accordance with the present embodiment detects undulations of the road surface by image processing of the road surface. The microcomputer 41 determines whether the road surface is rough on the basis of the state of the undulations of the road surface. In the case that the road surface is rough, the microcomputer 41 suppresses vibration caused by stress applied to the steerable wheels 12, by enhancing the torque inertia compensation control, in the same manner as the third embodiment.

Figure 10:
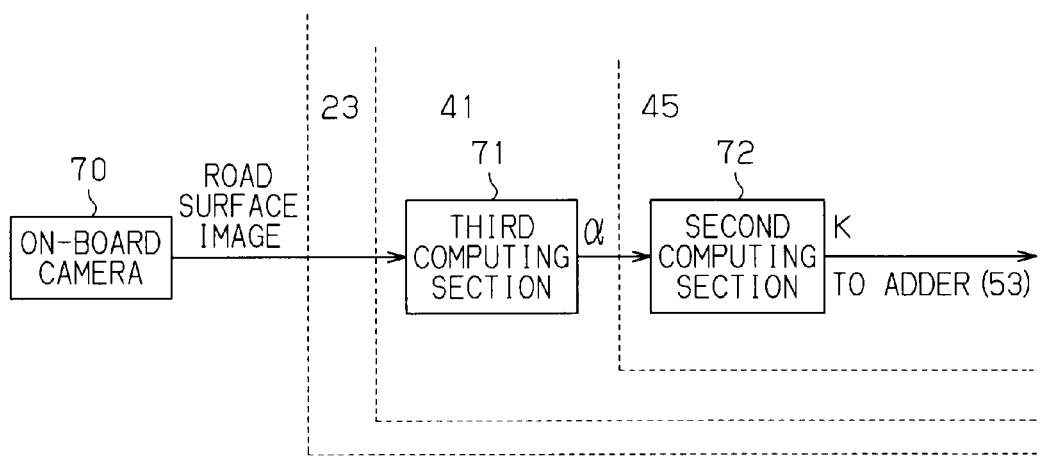
FIG. 10 is a control block diagram of an EPS in accordance with a fourth embodiment.

As shown in FIG. 10, the microcomputer 41 is provided with a third computing section 71 for image processing. A road surface image photographed by an on-board camera 70 is input to the third computing section 71. The third computing section 71 detects the undulations on the road surface by image processing of the road surface image. The third computing section 71 outputs a road surface undulation coefficient α indicating an irregularity degree of the road surface to a second computing section 72 computing the enhancing gain. In the present embodiment, the third computing section 71 outputs the road surface undulation coefficient α. The third computing section 71 increases the road surface undulation coefficient α as the irregularity degree of the road becomes higher, that is, as the undulations of the road surface become greater and the road surface becomes rougher.

Figure 11:
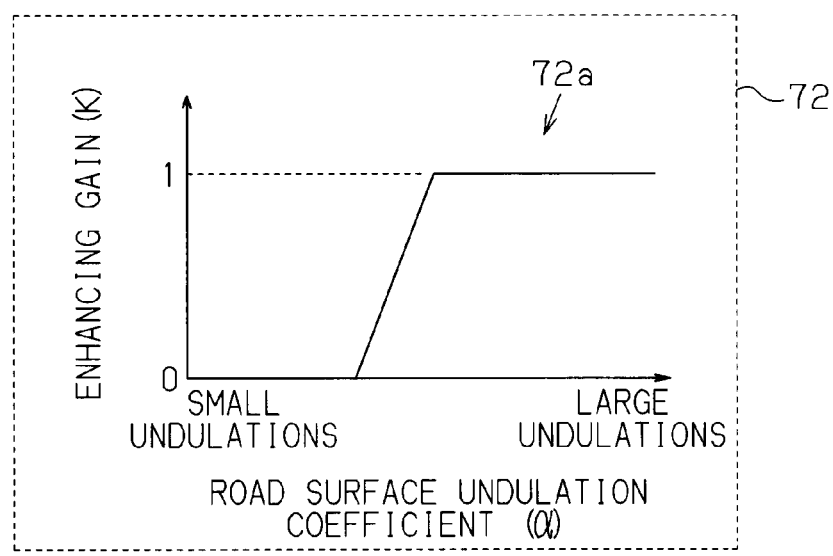
FIG. 11 is a schematic view of an outline structure of a second computing section in the fourth embodiment.

As shown in FIG. 11, the second computing section 72 in accordance with the present embodiment has a map 72a in which the road surface undulation coefficient α and the enhancing gain K are associated. In the map 72a, the enhancing gain K becomes greater in accordance with the increase in the road surface undulation coefficient α. The second computing section 72 refers to the map 72a with regard to the road surface undulation coefficient α that is input. Accordingly, the greater the value of the road surface undulation coefficient α becomes, the greater the value of the computed enhancing gain K becomes. Therefore, the torque inertia compensation amount Iti** is corrected and increased, and the torque inertia compensation control is enhanced.

Fifth Embodiment

A description will be given below of a fifth embodiment obtained by embodying the present invention with reference to the accompanying drawings.

A main difference between the present embodiment and the first embodiment lies only in the suppressing control of vibration caused by stress applied to the steerable wheels 12. Accordingly, as a matter of convenience for explanation, the same reference numerals are attached to the same portions as those of the first embodiment, and a description thereof will be omitted.

As mentioned above, the torque inertia compensation control has a vibration suppressing function. However, the torque inertia compensation control also has adverse effects such as deterioration of the steering feel ("slipping feeling" at a time of starting turning), the unstableness of the control (vibration) and the like. These adverse effects become more remarkable in a region in which the rising edge of the assist torque tends to be excessive, that is, in a region in which the absolute value of the steering torque differential value dτ is relatively small. Accordingly, as the EPS carrying out the torque inertia compensation control, there is an EPS in which a dead zone is set such that the torque inertia compensation amount Iti* comes to "zero" if the absolute value of the steering torque differential value dτ is within a predetermined range at a time of computing the compensation component based on the steering torque differential value dτ, that is, the torque inertia compensation amount Iti*.

However, there is a risk that the existence of the dead zone obstructs the effect of the compensation control, at the time of enhancing the torque inertia compensation control in the first embodiment. In other words, in the case that the steering torque differential value dτ is a value corresponding to the dead zone, the torque inertia compensation amount Iti* is zero regardless of the enhancing gain K. Accordingly, in this case, the effect of the compensation control is not achieved, and there is a risk that the vibration is not sufficiently suppressed. For example, small vibration may be transmitted to the steering wheel in some cases.

Taking this point into consideration, in the present embodiment, the dead zone is set in the computation of the torque inertia compensation amount Iti* at the normal time. The torque inertia compensation amount Iti* is computed while omitting the dead zone mentioned above at the time of enhancing the torque inertia compensation control.

Figure 12:
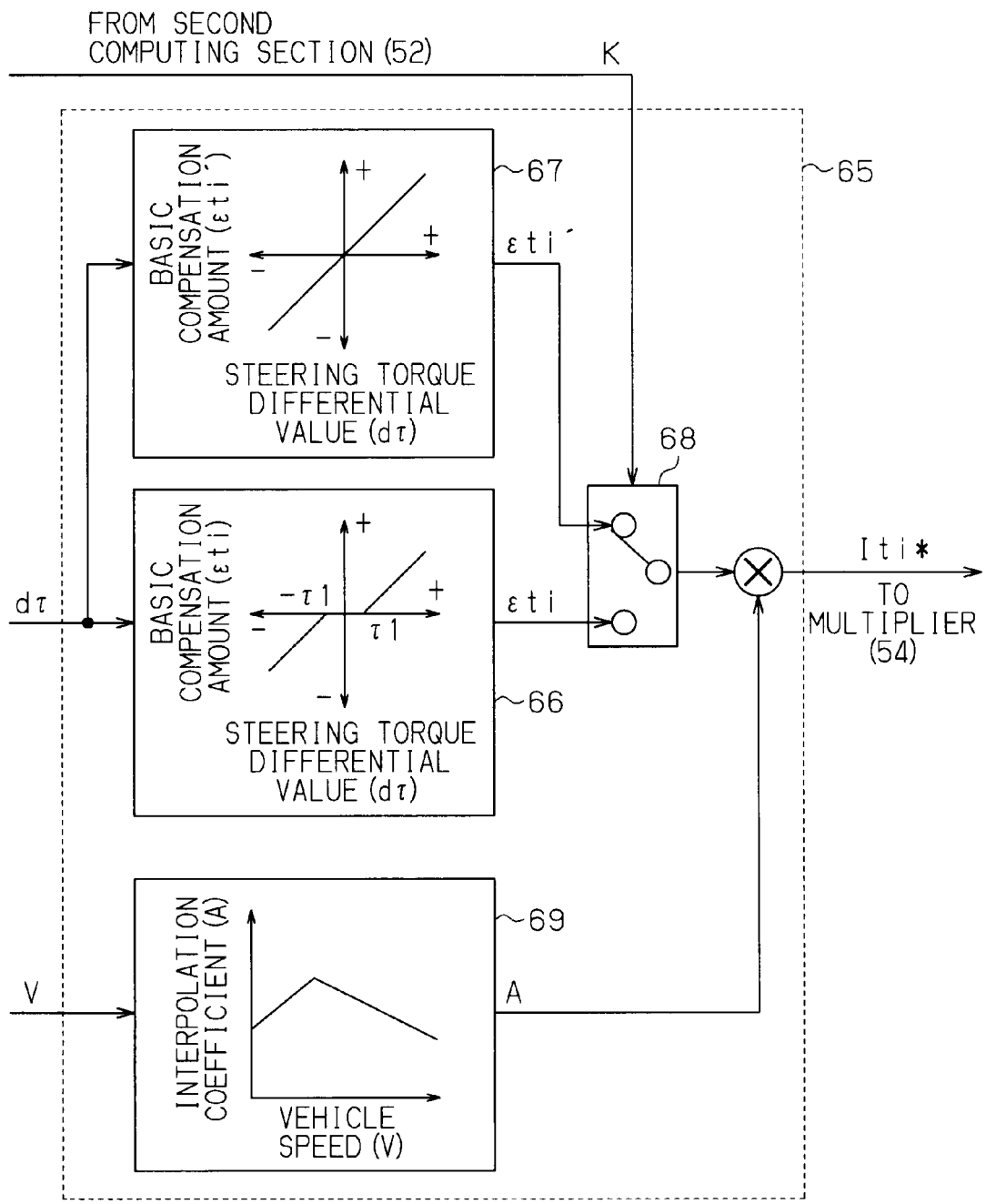
FIG. 12 is a control block diagram of a second control section in accordance with a fifth embodiment.

Describing in detail, as shown in FIG. 12, the second control section 65 in accordance with the present embodiment is provided with two kinds of maps 66 and 67 in which the steering torque differential value dτ and the basic compensation amount εti (εti') are associated (within the first computing section 45, refer to FIG. 2). In the map 66, the dead zone is set in a range ($-\tau 1 \leqq \tau \leqq \tau 1$) in which the absolute value of the steering torque differential value dτ is equal to or less than "τ1". The second control section 65 switches two maps 66 and 67 on the basis of with or without the enhancement of the torque inertia compensating control, and employs either of the two maps for computing the torque inertia compensation amount Iti*.

Specifically, both of the basic compensation amount εti computed on the basis of the map 66 in which the dead zone is set, and the basic compensation amount εti' computed on the basis of the map 67 in which the dead zone is not set are input to the switching control section 68. The enhancing gain K (refer to FIG. 2) output from the second computing section 52 is input to the switching control section 68. In the case that the value of the enhance gain K is "0", the switching control section 68 outputs the basic compensation amount εti computed on the basis of the map 66. In the case that the value of the enhancing gain K is "other than 0", the switching control section 68 outputs the basic compensation amount εti' computed on the basis of the map 67. In other words, at the normal time, the switching control section 68 outputs the basic compensation amount εti computed on the basis of the map 66 in which the dead zone is set. At a time of enhancing the torque inertia compensation control, the switching control section 68 outputs the basic compensation amount εti' computed on the basis of the map 67 in which the dead zone is not set. In the present embodiment, the second control section 65 computes the torque inertia compensation amount Iti* by multiplying the basic compensation amount εti or εti output from the switching control section 68 by the interpolation coefficient A computed on the basis of a map 69.

In accordance with the present embodiment, at the time of enhancing the torque inertia compensation control, it is normally possible to make good use of the effect of the torque inertia compensation control, even in the range in which the torque inertia compensation amount Iti* corresponding to the compensation component comes to zero, that is, the range in which (the absolute value of) the steering torque differential value dτ is small. As a result, it is possible to more effectively suppress the vibration.

Each of the embodiments may be modified as follows.

In each of the embodiments, the present invention is embodied in the column type EPS 1, however, may be applied to a rack type EPS which applies assist force to the rack shaft 5, or a pinion type EPS which applies assist force to the pinion shaft 10.

In each of the embodiments, the torque inertia compensation control is enhanced by computing the enhancing gain K (K') in correspondence to the power spectrum Sp corresponding to the effective value of the frequency component corresponding to the vibration of the steering system caused by stress applied to the steerable wheels 12, and multiplying the torque inertia compensation amount Iti* by the enhancing gain K'. However, the torque inertia compensation control is not limited to this. For example, the torque inertia compensation control may determine whether the power spectrum Sp is equal to or more than a predetermined threshold value, or may change the torque inertia compensation amount Iti*, for example, in more stages.

Figure 13:
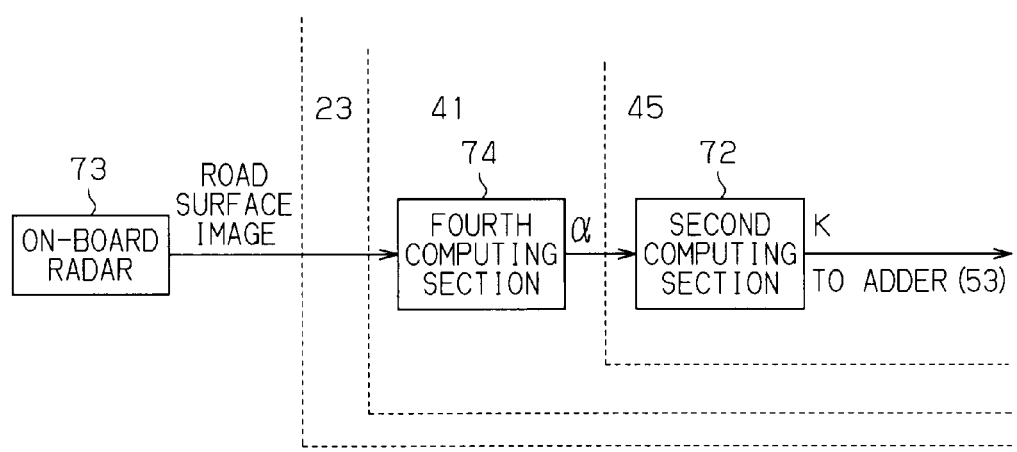
FIG. 13 is a control block diagram of an EPS in accordance with another embodiment.

In the fourth embodiment, the undulations of the surface of the road is detected by image processing of the road surface. However, the structure is not limited to this, but the microcomputer 41 may be provided with a fourth computing section 74 for a radar detection as shown in FIG. 13. In this case, the microcomputer 41 detects the undulations of the surface of the road on the basis of the road surface information detected by an on-board radar 73. Further, in the same manner as the fourth embodiment, the fourth computing section 74 sets the irregularity degree determined on the basis of the detected road surface state to the road surface undulation coefficient α so as to output to the second computing section 72. Accordingly, the torque inertia compensation control is enhanced. Even in this case, it is possible to obtain the same advantages as the fourth embodiment.

In the second embodiment, the determining section 61 determines whether the steering operation is being performed, on the basis of the steering toque τ, the steering angle θs, the steering speed ωs, and the yaw rate γ of the vehicle (refer to FIG. 7). However, at the time of determining whether the steering operation is being performed, it is possible to optionally change the combination of the steering toque τ, the steering angle θs, the steering speed ωs, and the yaw rate γ. Alternatively, other state quantities may be employed.

In the second embodiment, the enhancement of the torque inertia compensation control, that is, the increase in the torque inertia compensation amount Iti* is executed only in the case that the vehicle speed V is in the predetermined speed range (V1≦V≦V2), and at a time when the steering is not being operated (refer to FIG. 8). However, the configuration is not limited to this, but it is possible to omit any of the restriction relating to the vehicle speed (step 301), and the restriction relating to the steering state (step 302).

Further, in the first and second embodiments, the enhancement of the torque inertia compensation control, that is, the increase in the torque inertia compensation amount Iti* is executed, in the case that the power spectrum Sp is equal to or more than the predetermined threshold value, as a result of calculating the power spectrum Sp corresponding to the effective value of the frequency component corresponding to vibration of the steering system caused by stress applied to the steerable wheels 12. However, the configuration is not limited to this. For example, as shown in a flowchart in FIG. 14, it is possible to determine whether the vehicle speed V is in the predetermined speed range (V1≦V≦V2) (step 502) after acquiring each of the state quantities (step 501). The predetermined speed range in this case is set to a speed range in which the resonance is generated in the suspension of the vehicle and the vibration of the steering system is amplified. In the case that the vehicle speed V is in the predetermined speed range (YES in step 502), the enhancement of the torque inertia compensation control (the increase in the torque inertia compensation amount Iti*) is executed (step 503), and in the case that the vehicle speed V is not in the predetermined speed range (NO in step 502), the normal control is executed (step 504). Even in the structure mentioned above, it is possible to suppress the vibration of the steering system caused by stress applied to the steerable wheels 12. Further, since the extraction of the specific frequency component, and the calculation of the effective value of the extracted frequency component are not carried out, there is an advantage that the computation load is small.

Figure 15:
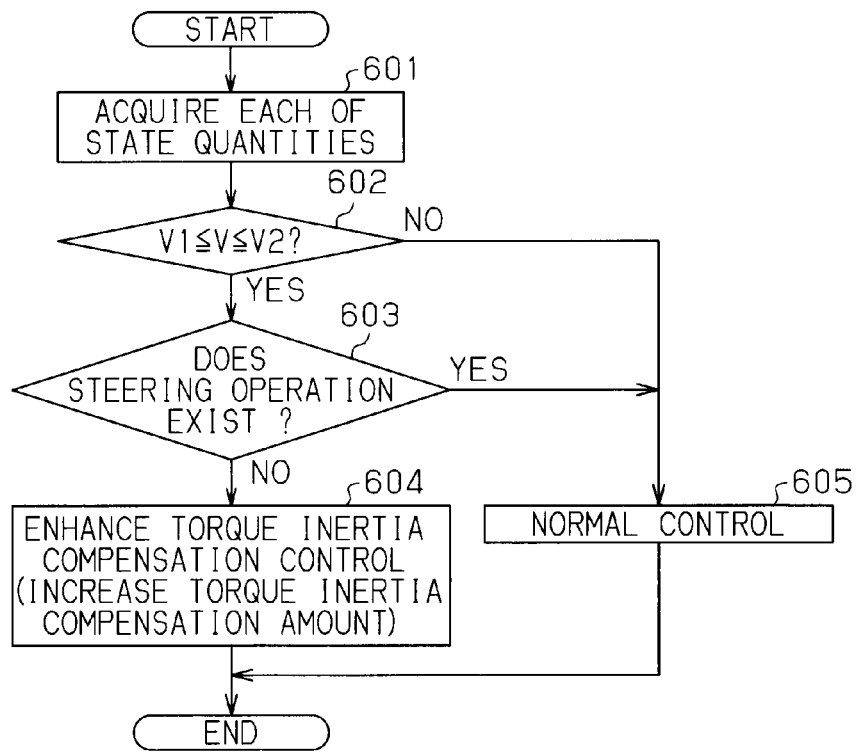
FIG. 15 is a flowchart showing a vibration suppression control in accordance with another embodiment.

Further, as shown in a flowchart in FIG. 15, the same restriction relating to the steering state (step 603) as the second embodiment may be added. In accordance with this configuration, it is possible to more effectively avoid deterioration of the steering feel caused by the enhancement of the torque inertia compensation control.

Figure 14:
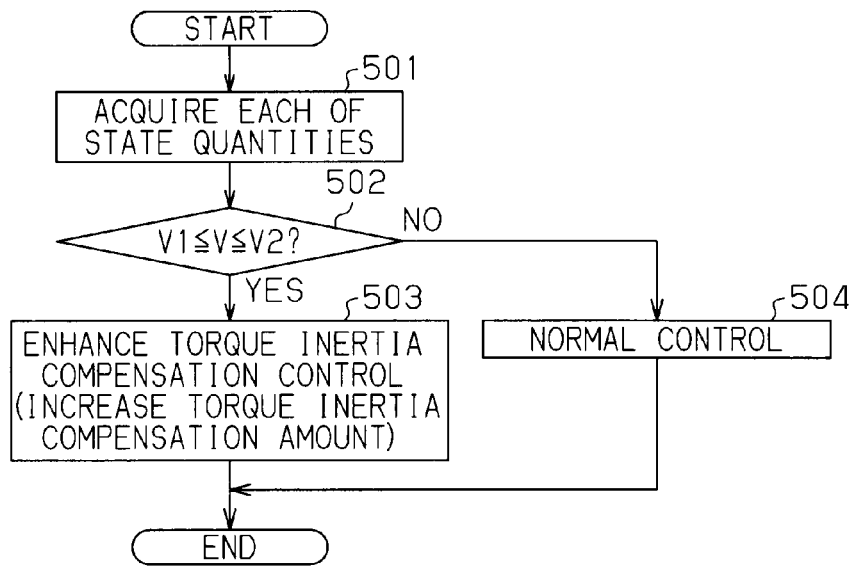
FIG. 14 is a flowchart showing a vibration suppression control in accordance with another embodiment.

In this case, processes in steps 601 and 602 in the flowchart of FIG. 15 are the same as the processes in steps 501 and 502 in the flowchart of FIG. 14, and processes in steps 604 and 605 are the same as the processes of steps 503 and 504. As a matter of convenience for explanation, a description thereof will be omitted.

In the first and second embodiments, the pinion angle θp indicating the rotation angle of the pinion shaft 10 constructing the steering system is used as a signal indicating the state of the steering system. However, the configuration is not limited to this, but it is possible to employ a steering angle θs (a steering wheel angle) corresponding to a rotation angle of the steering wheel 2, or the steering torque τ detected by the torque sensor 31. The pinion angle θp, the steering angle θs and the steering torque τ in the frequency analysis do not correspond to an instantaneous value, but are based on a continuous value. Further, this can be applied to the wheel speed V_w in the third embodiment in the same manner.

The fifth embodiment is embodied on the basis of the configuration of the first embodiment, however, is not limited to this. As shown in the second to fourth embodiments and each of the modified embodiments, the fifth embodiment may be applied to any configuration which suppresses vibration on the basis of the enhancement of the torque inertia compensation control.

The invention claimed is:

1. An electric power steering apparatus applied to a steering system that transmits a steering operation of a driver to a steerable wheel, the apparatus comprising:
    a steering force assist device provided with a motor as a driving source, the steering force assist device applying an assist force for assisting the steering operation to the steering system;
    control means controlling an actuation of the steering force assist device on the basis of a signal indicating a state of the steering system based on a rotation angle of a pinion shaft, wherein the control means computes a target assist force to be generated in the steering force assist device by adding a compensation component based on a differential value of a steering torque to a basic assist component; and
    extracting means capable of extracting, from the signal indicating the state of the steering system, a specific frequency component corresponding to a vibration generated in the steering system on the basis of a stress applied to the steerable wheel,
    wherein, when the effective value of the extracted specific frequency component is equal to or more than a predetermined threshold value, the control means increases the compensation component based on the differential value of the steering torque.

2. The electric power steering apparatus according to claim 1, wherein the control means increases the compensation component in accordance with an increase in the effective value.

3. The electric power steering apparatus according to claim 1, wherein the control means increases the compensation component only in the case that a vehicle speed exists in a predetermined speed range.

4. The electric power steering apparatus according to claim 1, wherein, in the computation of the compensation component based on the differential value of the steering torque, a dead zone in which the compensation component comes to zero is set in the case that the absolute value of the differential value exists within a predetermined range, and wherein the control means abolishes the dead zone at a time of executing the control increasing the compensation component.

\* \* \* \* \*